June 15, 1943.	H. D. GEYER	2,321,669
FREEZING TRAY
Filed March 10, 1939	3 Sheets-Sheet 1
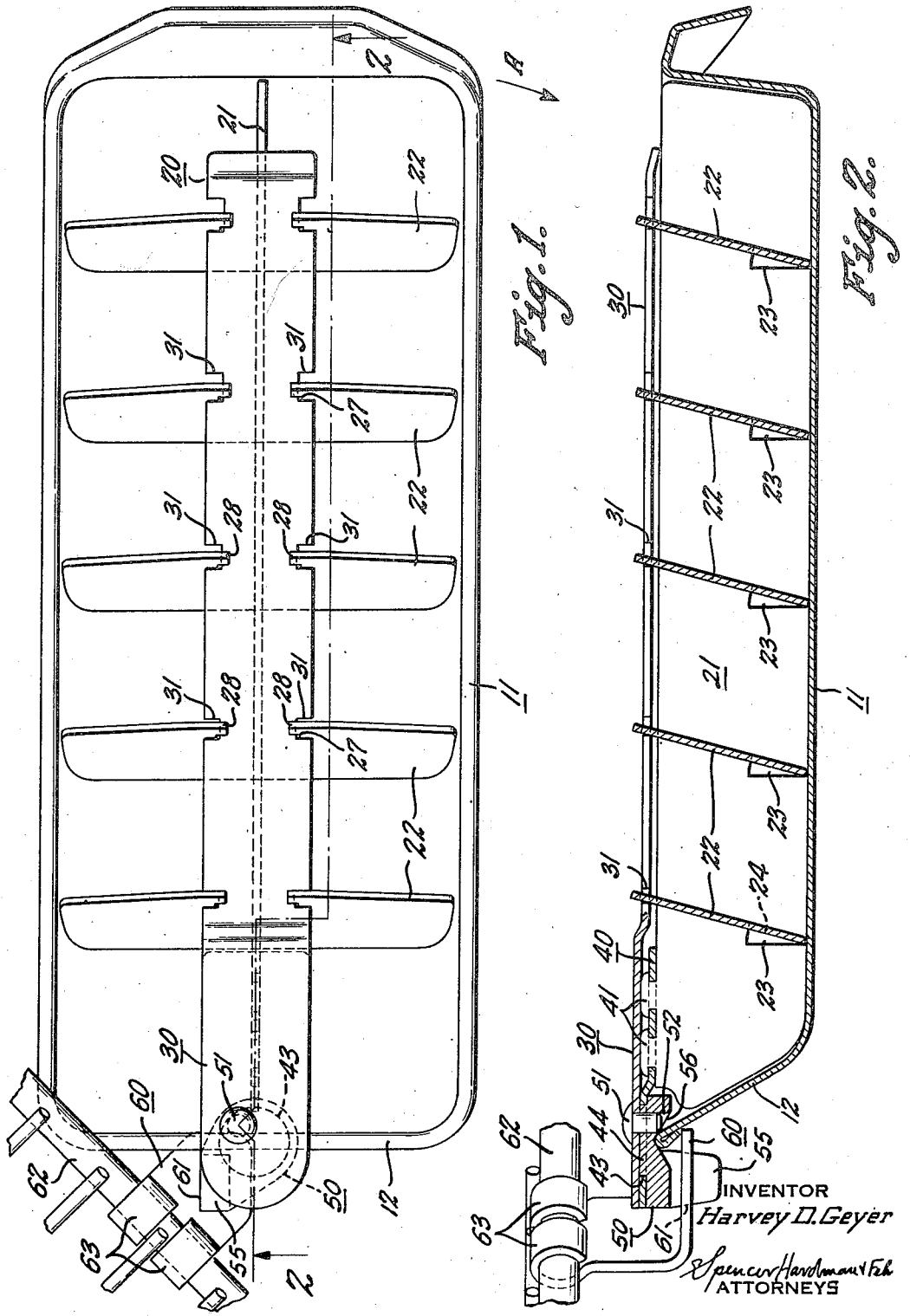
INVENTOR
Harvey D. Geyer
ATTORNEYS June 15, 1943.  H. D. GEYER  2,321,669
FREEZING TRAY
Filed March 10, 1939 3 Sheets-Sheet 2
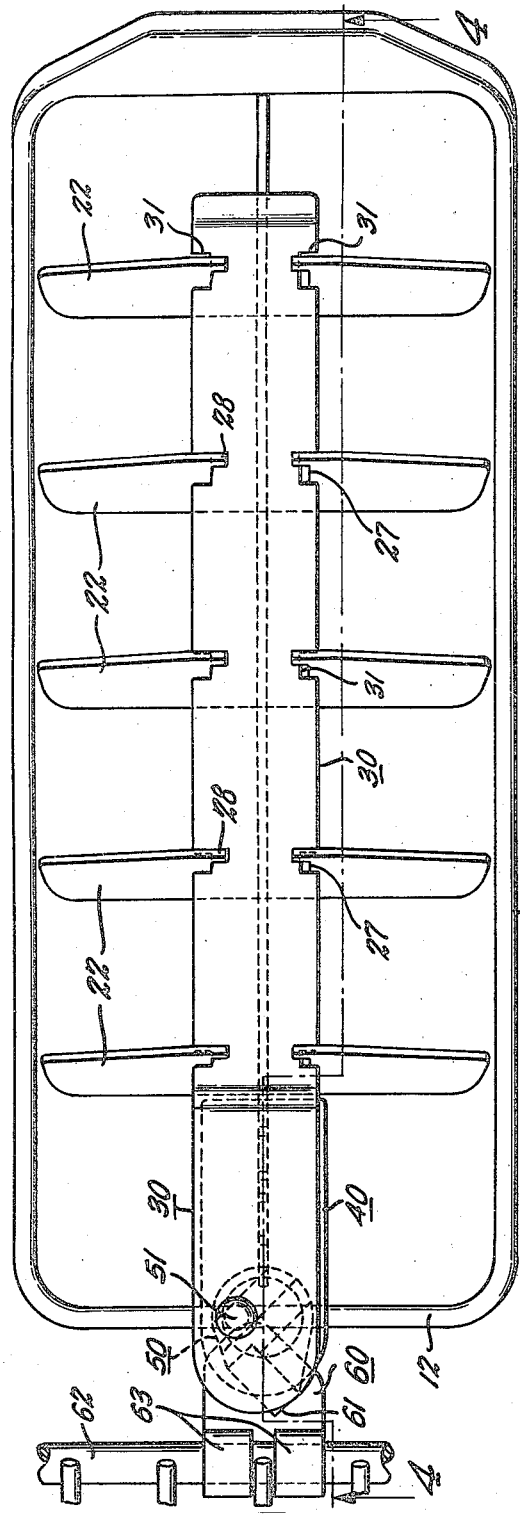
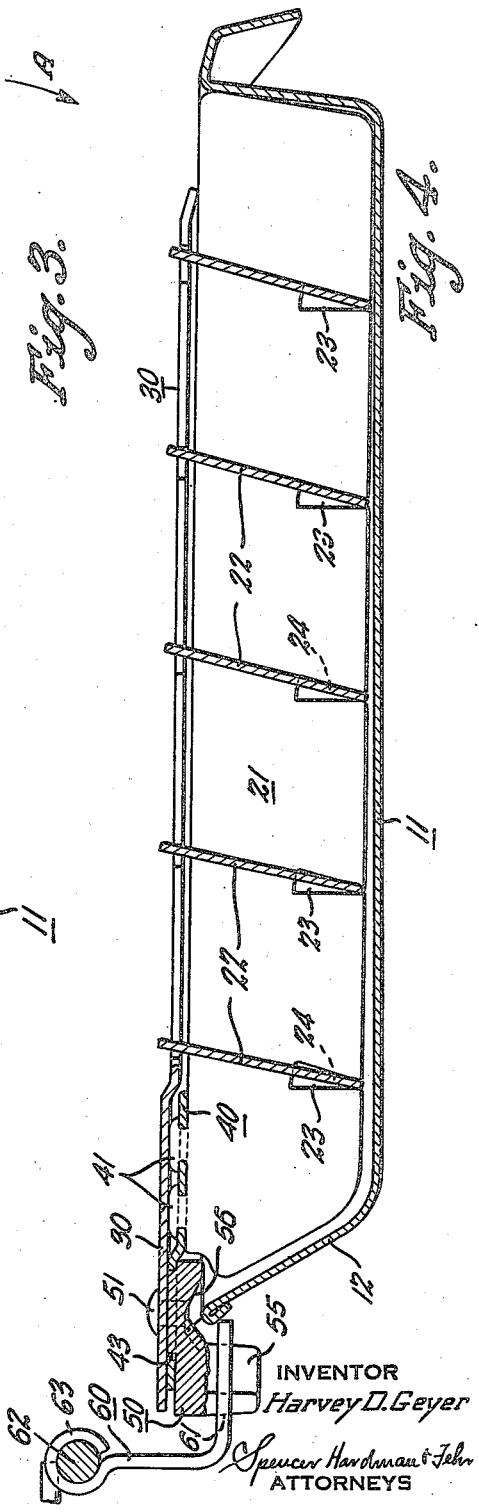
INVENTOR
*Harvey D. Geyer*
*Spencer Hardman & John*
ATTORNEYS

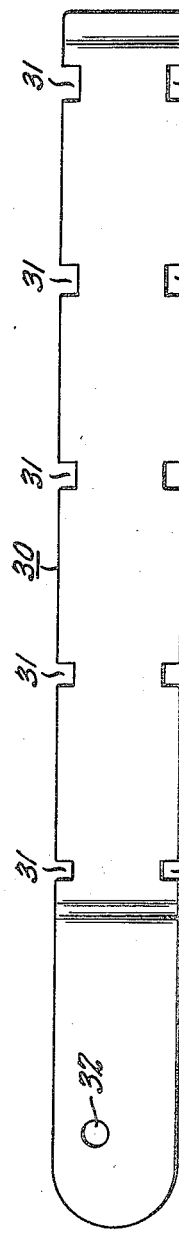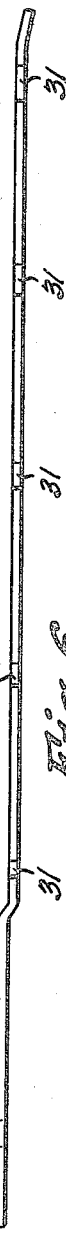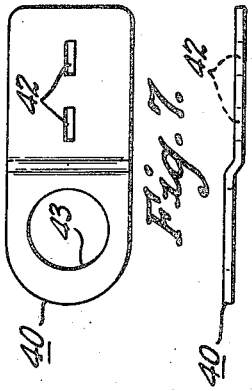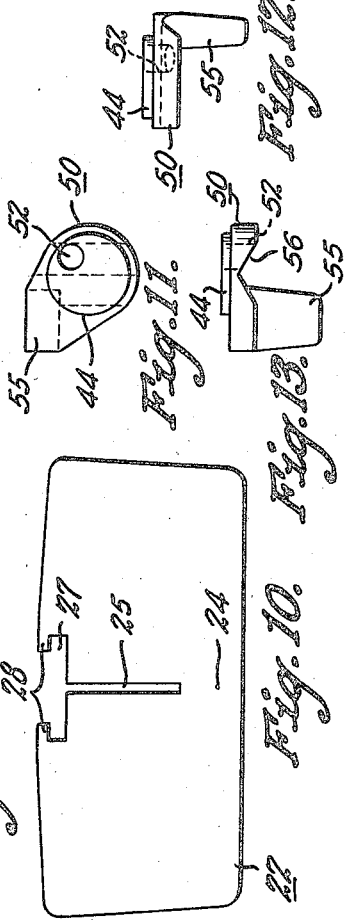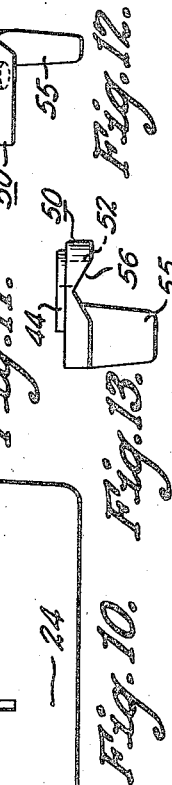

Patented June 15, 1943

2,321,669

UNITED STATES PATENT OFFICE 2,321,669

FREEZING TRAY

Harvey D. Geyer, Dayton, Ohio, assignor to General Motors Corporation, Detroit, Mich., a corporation of Delaware Application March 10, 1939, Serial No. 260,909

7 Claims. (Cl. 62—108.5)

This invention relates to freezing trays, especially to the portable type adapted for use in household refrigerators.

An object of this invention is to provide an improved form of mechanically operated tray from which the frozen ice blocks may be readily removed without melting the ice loose.

One feature of this invention is the very simple and efficient mechanism having a short actuating cam member, one end of which is adapted to be inserted into a stationary retaining socket while the pan and grid are bonded to the frozen contents, and thereafter operated by swinging the pan and/or the grid about the stationary retaining socket. Thus the pan unit, or the grid unit, serves as a relatively long hand lever for forcing the relative movement of the actuating cam. The relative swinging of the actuating cam causes relative movement between the grid walls and also forces the pan from its grid and ice contents, whereby to free the ice blocks without melting them loose.

Another feature of this invention is the slot arrangement between the loosely assembled cross partitions of the grid and the longitudinal actuating bar, whereby these parts may be readily assembled together upon the main longitudinal partition and thereafter mutually retain each other in assembled relationship. The actuating bar extends through undercut notches in the upper margins of the cross partitions and thus prevents said cross partitions from falling out due to gravity when the empty grid is lifted from the pan.

Further objects and advantages of the present invention will be apparent from the following description, reference being had to the accompanying drawings wherein a preferred embodiment of the present invention is clearly shown.

In the drawings:

Fig. 1 is a plan view of the grid and pan of this invention, and shows the short actuating cam member on the grid inserted into its socket in a stationary bracket, all the parts being in their positions at the beginning of the ice ejecting operation.

Fig. 2 is a section on line 2—2 of Fig. 1.

Fig. 3 is similar to Fig. 1, but shows the pan and grid having been swung about the stationary socket about 45 degrees to move the actuating bar longitudinally of the grid about half of its total travel.

Fig. 4 is a section on line 4—4 of Fig. 3, and illustrates the pan having been cammed downwardly from the grid by cam surfaces on the short actuating cam.

Figs. 5 and 6 are top and edge views respectively of the central actuating bar.

Figs. 7 and 8 are top and edge views respectively of the extension member fixed to the main grid wall.

Fig. 9 is a detail view of the main grid wall.

Fig. 10 is a detail view of a cross wall.

Figs. 11, 12, and 13 are detail views of the short actuating cam member; Fig. 11 is a plan view and Figs. 12 and 13 are side elevations thereof.

Similar reference characters refer to similar parts throughout the several views.

Numeral 11 designates the container pan, which preferably is a one-piece drawn metal pan having considerable flexibility when empty and having its rear end wall 12 materially inclined as shown.

The removable partitioning grid 20 comprises a main longitudinal wall 21, and a series of longitudinally spaced cross walls 22 loosely mounted thereupon to divide the pan contents into two rows of ice blocks. Main wall 21 has a series of open slots 23 extending up from its bottom edge to loosely receive the continuous portions 24 of cross walls 22, while each cross wall 22 has an open slot 25 extending down from its upper edge to loosely receive the continuous portion 26 of main wall 21 above the slots 23.

Each cross wall 22 also has a relatively wide undercut notch 27 in its upper margin which loosely receives a notched portion of the longitudinal actuating bar 30 which overlies the main grid wall 21. Actuating bar 30 has a series of pairs of lateral notches 31 therein of barely sufficient depth to permit assembling of bar 30 into the undercut notches 27 by laterally tilting the bar 30 and thus inserting it past the ears 28 on cross walls 22. After bar 30 is inserted within the undercut notches 27 it is again turned to its horizontal plane, whereupon the two ears 28 of each cross wall 22 will necessarily overlap bar 30 as seen in Figs. 1 and 3, and thus prevent said cross walls from dropping down by gravity from their assembled relationship with main wall 21.

An extension member 40 is rigidly fixed to one end of main wall 21 by means of lugs 41 thereon being inserted thru holes 42 in member 40 and then riveted over on the top side thereof as clearly shown in Fig. 2. Member 40 has a large hole 43 therein which fits loosely upon and serves as a bearing for the round projection 44 on the actuating cam member 50. This actuating cam member 50 is held permanently in place by the headed pin 51 which extends loosely thru hole 32 in actuating bar 30 but has a tight pressed fit in hole 52 in cam member 50. Hence cam member 50 can rotate within hole 43 and this will cause the eccentrically located pin 51 to move in an arc about the center of hole 43, and this in turn will cause the connected end of actuating bar 30 to also move in said arc. This means that the actuating bar 30 may be moved longitudinally relative to main wall 21 by the rotation of cam member 50 within hole 43.

Now when actuating bar 30 is moved longitudinally toward the left from its freezing position shown in Fig. 1, the cross walls 22 will be tilted forward relative to main wall 21 by the engagement of notches 31 with said cross walls and thus loosen the frozen ice blocks bonded to these dividing walls. Preferably these notches 31 increase in width progressively from the near end to the far end of bar 30 as shown, so that cross walls 22 are tilted forward successively rather than all at the same time.

The means and method of rotating cam member 50 for ejecting the ice blocks will now be described. Cam member 50 has a depending rectangular projection 55, which is preferably slightly tapered as shown and is adapted to be readily inserted within a corresponding hole 61 in a stationary retaining bracket 60 which may be located at any convenient and suitable place. Preferably bracket 60 is rigidly fixed to some stationary part of the refrigerator itself so that the operator will not have to carry the ice tray with its frozen contents bonded thereto away from the refrigerator in order to eject the ice blocks. In Figs. 1 to 4 bracket 60 is shown rigidly fixed to a shelf grid 62 of the refrigerator by means of portions 63 of bracket 60 being clamped around a quite heavy bar on the stationary shelf. Of course the filled ice tray is withdrawn from its freezing compartment by the operator and moved to a position where the projection 55 is inserted into hole 61 in bracket 60. Figs. 1 and 2 show all the parts in position just prior to the ice-ejecting operation. It will be noted that pin 51 is toward the rear of the center of hole 43 and the entire tray is at about a 45 degree angle to the front bar 62 of the stationary shelf.

Now to operate the ejecting mechanism, the operator swings the outer end of the filled pan and grid in the direction of arrow A of Fig. 1 while bracket 60 holds cam member 50 stationary. This causes a relative rotation of cam member 50 within hole 43 and hence moves pin 51 forward in an arc as described above. Fig. 3 shows the position of the parts after the pan and grid have been swung thru an angle of about 45 degrees and illustrates how the first two or three cross walls 22 have been tilted forward by the longitudinal movement of actuating bar 30. The swinging movement of the pan and grid may be continued further until all the cross walls 22 have been tilted forward to free all the ice blocks from their frozen bond to the pan and grid.

Cam member 50 preferably is provided on its under side with an inclined cam surface 56 which overlies and contacts the lip of pan 11 when all the parts are in freezing position, as shown in Fig. 2. Now when the outer end of pan 11 is swung about the stationary cam member 50, as above described, the contacting lip of pan 11 will ride upon cam surface 56 and be cammed outwardly and downwardly thereby as illustrated in Fig. 4, and thus pan 11 will be loosened from its entire ice contents during its initial swinging movement. After pan 11 is thus loosened from the ice contents it may be entirely removed and laid aside, and thereafter only the ice filled grid may be swung in the direction of arrow A in Fig. 1 to complete the tilting movement of all the cross walls 22. In other words, the presence of pan 11 is unnecessary for the proper operation of the ejecting mechanism of the grid. However it is preferable to hold pan 11 substantially in place with the hand during the ice-ejecting operation in order to catch the ice cubes as they are loosened and fall from the grid. Obviously, if desired, only several ice cubes may be removed at one operation simply by limiting the swinging movement of the pan and grid about cam member 50. The several loosened ice cubes may be removed from the pan and the remaining ice cubes left bonded to the grid and returned to the freezing chamber for future use. Cam member 50 may be readily lifted from or reinserted into socket 61 in stationary bracket 60 at any time.

By the mechanism of this invention no customary hand lever is required to actuate the ejecting mechanism, instead the pan and/or the grid serves as the swinging hand lever by means of which the manual actuating force is applied. It may be noted that member 50 is really a short horizontally-swinging lever with eccentric pivot bearings on main wall 21 and actuating bar 30, so far as its movement relative to the tray grid is concerned.

While the embodiment of the present invention as herein disclosed, constitutes a preferred form, it is to be understood that other forms might be adopted, all coming within the scope of the claims which follow.

What is claimed is as follows:

1. In combination, a freezing tray having a container pan and a removable grid for said pan, said grid having relatively movable division walls forming ice block compartments when the grid is within the pan, a stationary retaining means located apart from said pan and grid during freezing, and force-multiplying means carried by said grid for moving said division walls relative to each other to loosen the frozen ice blocks therefrom, said force-multiplying means having a projecting member adapted to be held stationary by said retaining means upon the removal thereto of the pan and grid and frozen contents, said force-multiplying means being thereafter operable to loosen the ice from said grid upon manually moving said grid relative to said stationary retaining means.

2. In a freezing tray, a container pan and a partitioning grid therefor, said grid comprising a main dividing wall and a series of spaced cross walls movably retained upon said main wall, said cross walls each having an undercut notch in its upper margin, and a movable actuating bar for moving said cross walls, said bar overlying said main wall and having portions extending within said undercut notches and a horizontally swinging lever reacting between said main wall and bar for moving said bar and cross walls relative to said main wall to facilitate the removal of the ice blocks.

3. In a freezing tray, a container pan and a partitioning grid therefor, said grid comprising a main dividing wall and a series of spaced cross walls movably retained upon said main wall, said cross walls each having an undercut notch in its upper margin, and a movable actuating bar for moving said cross walls, said bar overlying said main wall and having portions extending within said undercut notches and a lever pivoted upon said main wall and operatively engaging said bar and swingable in a horizontal plane for moving said bar and cross walls relative to said main wall.

4. In combination, a freezing tray having a container pan and a removable grid for said pan, said grid having relatively movable division walls forming ice block compartments when the grid is within the pan, a fixed retaining means located apart from and disconnected from said pan and grid during freezing, ice-ejecting means carried by said grid and having a member projecting from said grid, said fixed retaining means serving to receive and retain said projecting member upon the transfer of the grid with its frozen contents therein to said retaining means when it is desired to remove the ice, said ice-ejecting means being thereafter operable by swinging the grid together with its frozen contents relative to said fixed retaining means to move said division walls relative to each other to loosen the frozen ice blocks therefrom.

5. In combination, a freezing tray having a container pan and a removable grid for said pan, said grid having relatively movable division walls forming ice block compartments when the grid is within the pan, force-multiplying means carried by said grid for moving said walls relative to each other to loosen the frozen ice blocks therefrom, and a separate stationary retaining means adapted to be engaged with and hold stationary a portion of said force-multiplying means after the ice is frozen and thus serve to actuate said force multiplying means when said grid is moved relative to said stationary retaining means.

6. In combination, a freezing tray having a container pan and a removable grid for said pan, said grid having relatively movable division walls forming ice block compartments when the grid is within the pan, force-multiplying means carried by said grid for moving said walls relative to each other to loosen the frozen ice blocks therefrom, and a stationary bracket adapted to be readily engaged with a portion of said force-multiplying means by bodily moving the pan and grid to said bracket after the ice is frozen, said bracket thereafter aiding in the actuation of said force-multiplying means when said pan and grid are swung bodily about said stationary bracket to loosen the frozen ice blocks from said pan and grid.

7. In a combination, a freezing tray having a container pan and a removable grid for said pan, said grid having relatively movable division walls forming ice block compartments when the grid is within the pan, a stationary retaining means located apart from said pan and grid during freezing, an actuating bar carried by said grid for moving said division walls relative to each other to loosen the frozen ice blocks therefrom, and force-multiplying means having a portion thereof adapted to be engaged with said retaining means by bodily moving the grid to said stationary retaining means after the ice is frozen, said force-multiplying means being thereafter operable in such manner as to force said actuating bar to move said division walls when the grid and its contained ice blocks are swung together relative to said retaining means to facilitate the removal of the frozen ice blocks.

HARVEY D. GEYER.